United States Patent
Kumar et al.

(10) Patent No.: US 11,829,770 B2
(45) Date of Patent: Nov. 28, 2023

(54) CLUSTERED OBJECT STORAGE PLATFORM RAPID COMPONENT REBOOT

(71) Applicant: Dell Products, L.P., Round Rock, TX (US)

(72) Inventors: Suren Kumar, Bangalore (IN); Vinod Durairaj, Bangalore (IN); Veena Ramarao, Bangalore (IN)

(73) Assignee: DELL PRODUCTS, L.P., Round Rock, TX (US)

( * ) Notice: Subject to any disclaimer, the term of this patent is extended or adjusted under 35 U.S.C. 154(b) by 44 days.

(21) Appl. No.: 17/574,873

(22) Filed: Jan. 13, 2022

(65) Prior Publication Data

US 2023/0221963 A1    Jul. 13, 2023

(51) Int. Cl.
G06F 9/4401     (2018.01)
G06F 11/30      (2006.01)

(52) U.S. Cl.
CPC ........ *G06F 9/4401* (2013.01); *G06F 11/3024* (2013.01); *G06F 11/3055* (2013.01)

(58) Field of Classification Search
None
See application file for complete search history.

(56) References Cited

U.S. PATENT DOCUMENTS

| | | | |
|---|---|---|---|
| 6,223,305 B1* | 4/2001 | Simmons | H04L 12/4641 714/34 |
| 2003/0154421 A1* | 8/2003 | Abe | G06F 1/266 714/2 |
| 2008/0204308 A1* | 8/2008 | Mayer | G01S 7/4021 342/195 |
| 2015/0331754 A1* | 11/2015 | Grobelny | G06F 11/1438 714/23 |
| 2017/0278007 A1* | 9/2017 | Anchuri | G06F 11/3419 |
| 2021/0191795 A1* | 6/2021 | Misra | G06F 15/7807 |

* cited by examiner

*Primary Examiner* — Paul Yen
(74) *Attorney, Agent, or Firm* — Amin, Turocy & Watson, LLP

(57) ABSTRACT

Technology described herein is generally directed towards an efficient process to selectively boot (e.g., initialize, reboot, re-initialize and/or the like) one or more nodes of a server node system based on contextual information that can be automatically acquired. In an embodiment, a system can comprise a processor, and a memory that stores executable instructions that, when executed by the processor, can facilitate performance of operations. The operations can comprise monitoring operational activity of a node of a software-defined object storage system. The operations can comprise, in response to occurrence of a negative activity event determined based on a result of the monitoring, determining whether a node reboot of the node is to be implemented. The operations can comprise, based on the operational activity analyzed, setting a reboot flag indicating that the node reboot is to comprise a reboot of less than all components of the node.

20 Claims, 10 Drawing Sheets

CLUSTERED OBJECT STORAGE PLATFORM RAPID COMPONENT REBOOT

BACKGROUND

Server node systems can comprise a plurality of servers, routers and controllers. A server node system can be employed at least partially as a cloud storage system comprising one or more clusters of objects, such as data, metadata, files, applications, logs, databases and/or the like. Such server node system can comprise a plurality of nodes, each comprising one or more servers, per-node control software and/or the like. Each node can comprise one or more modules having respective module hardware and software. A module can be distributed across one or more servers of a node. Management of communications among the nodes, maintenance of security protocols and bandwidth balancing, among other operations, can be managed by one or more administrator devices, such as one or more computers, servers and/or the like. Initializing and/or re-initializing a node, such as via control of an administrator device, can comprise the respective initialization and/or reinitialization of all respective modules of the node.

SUMMARY

The following presents a simplified summary of the disclosed subject matter to provide a basic understanding of one or more of the various embodiments described herein. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An example system can comprise a processor, and a memory that stores executable instructions that, when executed by the processor, can facilitate performance of operations. The operations can comprise monitoring operational activity of a node of a software-defined object storage system. The operations can comprise, in response to occurrence of a negative activity event determined based on a result of the monitoring, determining whether a node reboot of the node is to be implemented. The operations can comprise, based on the operational activity analyzed, setting a reboot flag indicating that the node reboot is to comprise a reboot of less than all components of the node.

In one or more embodiments, the operations can comprise, in response to the setting of the reboot flag, monitoring activity of the node before, during and after the reboot according to the reboot flag.

In one or more embodiments, the operations can comprise, identifying the occurrence of the negative activity event based on a comparison of operational activity data representative of the operational activity of the node to historical operational activity data representative of historical operational activity of the node or of another node of the software-defined object storage system.

In one or more embodiments, the operations can comprise, generating a recommendation for a full reboot as a function of a frequency threshold applicable to a frequency of occurrences of negative activity events, wherein the generating comprises generating the recommendation in response to the frequency of occurrences of the negative activity events exceeding the frequency threshold.

An example method can comprise recognizing, by a system comprising a processor, an operational node issue or health-related node issue of a node of an object storage system, generating, by the system, a reboot recommendation for a reboot of the node, wherein the reboot recommendation comprises one recommendation from a group of reboot recommendations, the group comprising a partial reboot of the node and a full reboot of the node, and outputting, by the system, the recommendation via an interface of the system.

An example non-transitory computer-readable medium can comprise executable instructions that, when executed by a processor, can facilitate performance of operations. The operations can comprise conducting a component-level analysis of components of a node of an object storage system, based on the component-level analysis, determining occurrence of a component-related issue of a first component of the node, and in response to the determining, and prior to a next boot cycle of the node, setting a reboot indicator flag specifying a reboot of the first component of the node.

BRIEF DESCRIPTION OF THE DRAWINGS

The technology described herein is illustrated by way of example and not limited in the accompanying figures in which like reference numerals indicate similar elements.

DETAILED DESCRIPTION

Overview

Figure 1:
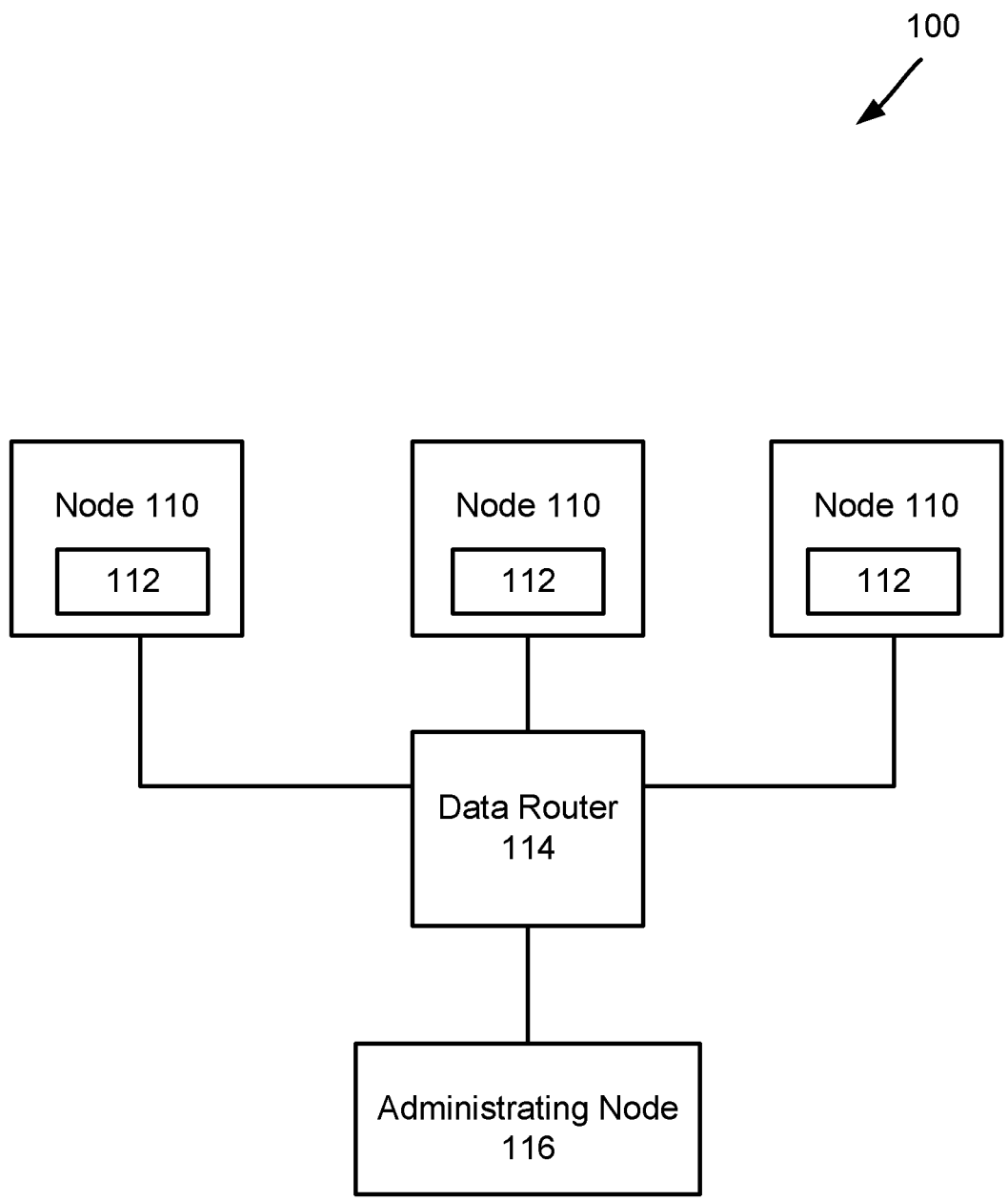
FIG. 1 illustrates a block diagram of example elements of a multi-node system, such as that provides a software-defined object storage system, in accordance with one or more embodiments and/or implementations described herein.

The technology described herein is generally directed towards an efficient process to selectively boot (e.g., initialize, re-boot, re-initialize and/or the like) one or more nodes of a server node system based on contextual information that can be automatically acquired.

With existing techniques, when an issue at a node or module occurs, a boot (e.g., reboot) is typically initiated. An issue can be software-related, hardware-related, or software-and-hardware-related. An exemplary can comprise and/or concern a hung node, high load, fabric lifecycle restart and/or the like.

As a result of such issues, and/or of one or more other issues, relative to existing techniques, a full node boot is initiated absent a determination of the issue and/or absent a determination of further impact of the issue. Modules of the node, e.g., all modules including hardware and/or software, can be re-booted regardless of whether an issue being addressed by the boot involves both software and hardware. In some cases, numerous software components can be shut down and booted, prolonging the boot process. These software components can comprise, but are not limited to, one or more storage engines, data services, provisions portals, fabrics, infrastructures and/or the like.

Further, during a boot, various processes can take place including, but not limited to, disk checks, disk mounts, CPU/memory initialization, node control software/hardware initialization, peripheral component interconnect express (PCIe) device enumeration and/or the like. In some cases, operations such as checking of disk status can be completed a hundred or more times per node, even though the issue causing the boot can be related a different application and/or service level of the node. Accordingly, as a result of a full boot of all software and hardware components, existing techniques can employ undesirable amounts of boot time and/or processing power.

One or more embodiments of devices, systems, methods and/or non-transitory machine-readable mediums are described herein that can provide one or more of these advantages while addressing one or more deficiencies of existing techniques.

For example, by analyzing an issue that has and/or is occurring at a node, and further by assessing one or more impacts of the issue, contextual booting (e.g., selective booting based on acquired contextual information) can be enabled. The selective booting can allow for software booting of a node, separate from full hardware and software booting. In one or more embodiments, the selective booting can allow for one or more particular software components and/or hardware components to be booted, absent booting of other software and/or hardware components, such as where an issue has occurred relating to only one or more of the aforementioned various processes. This can in turn reduce boot time, reduce processing power consumed, reduce monitoring by an administrator device and/or increase customer satisfaction with a respective server node system.

Indeed, one or more embodiments described herein can proactively address one or more module-related and/or node-related issues via frequency-based monitoring, and by setting one or more flags for being encountered during a boot. Accordingly, when a next node boot occurs, contextual information gathered regarding the module-related and/or node-related issue(s) can be employed to selectively boot one or more portions of a node. Likewise, one or more operations described herein can be employed at a module-level, within a node, for booting of one or more modules.

Reference throughout this specification to "one embodiment," "an embodiment," "one implementation," "an implementation," etc. means that a particular feature, structure, or characteristic described in connection with the embodiment/implementation can be included in at least one embodiment/implementation. Thus, the appearances of such a phrase "in one embodiment," "in an implementation," etc. in various places throughout this specification are not necessarily all referring to the same embodiment/implementation. Furthermore, the particular features, structures, or characteristics may be combined in any suitable manner in one or more embodiments/implementations.

As used herein, with respect to any aforementioned and below mentioned uses, the term "in response to" can refer to any one or more states including, but not limited to: at the same time as, at least partially in parallel with, at least partially subsequent to and/or fully subsequent to, where suitable.

As used herein, the term "entity" can refer to a machine, device, smart device, component, hardware, software and/or human.

As used herein, the term "cost" can refer to power, money, memory, processing power and/or the like.

As used herein, the term "resource" can refer to power, money, memory, processing power and/or the like.

Example Contextual Boot Management Architectures

One or more embodiments are now described with reference to the drawings, where like referenced numerals are used to refer to like elements throughout. In the following description, for purposes of explanation, numerous specific details are set forth to provide a more thorough understanding of the one or more embodiments. It is evident, however, in various cases, that the one or more embodiments can be practiced without these specific details.

Further, the embodiments depicted in one or more figures described herein are for illustration only, and as such, the architecture of embodiments is not limited to the systems, devices and/or components depicted therein, nor to any particular order, connection and/or coupling of systems, devices and/or components depicted therein. For example, in one or more embodiments, the non-limiting system architecture 100 as illustrated at FIG. 1, and/or systems thereof, can further comprise one or more computer and/or computing-based elements described herein with reference to an operating environment, such as the operating environment 900 illustrated at FIG. 9. In one or more described embodiments, computer and/or computing-based elements can be used in connection with implementing one or more of the systems, devices, components and/or computer-implemented operations shown and/or described in connection with FIG. 1 and/or with other figures described herein.

Turning first to FIG. 1, a multi-node system 100 is illustrated that can employ a contextual boot management system to be described in detail below, in accordance with one or more embodiment described herein. The system 100 can comprise a plurality of nodes 110, each comprising one or more servers. Each node 110 can comprise a plurality of modules 112, which modules 112 can comprise one or more respective software components and/or one or more respective hardware components. The nodes 110, and thus the modules 112 of the nodes 110, can be in communication with one another via a communication device, such as a data router 114. An administrating node 116 can comprise one or more servers and likewise also can be interconnected with the nodes 110/modules 112 via the data router 114. Although illustrated separately, in one or more embodiments, the administrating node 116 also can comprise one or more modules 112 and/or can be and/or serve as an additional server node 110 of the multi-node system 100.

In one or more embodiments, the multi-node system 100 can provide a software-defined object storage system. Servers of the multi-node system 100 can be employed for storage and access of such objects. One or more storage control software components at the nodes 110 and/or the administrating node can facilitate the storing and access of such objects. These one or more storage control software components can be comprised by the one or more respective software components at the aforementioned modules 112/nodes 110.

Figure 2:
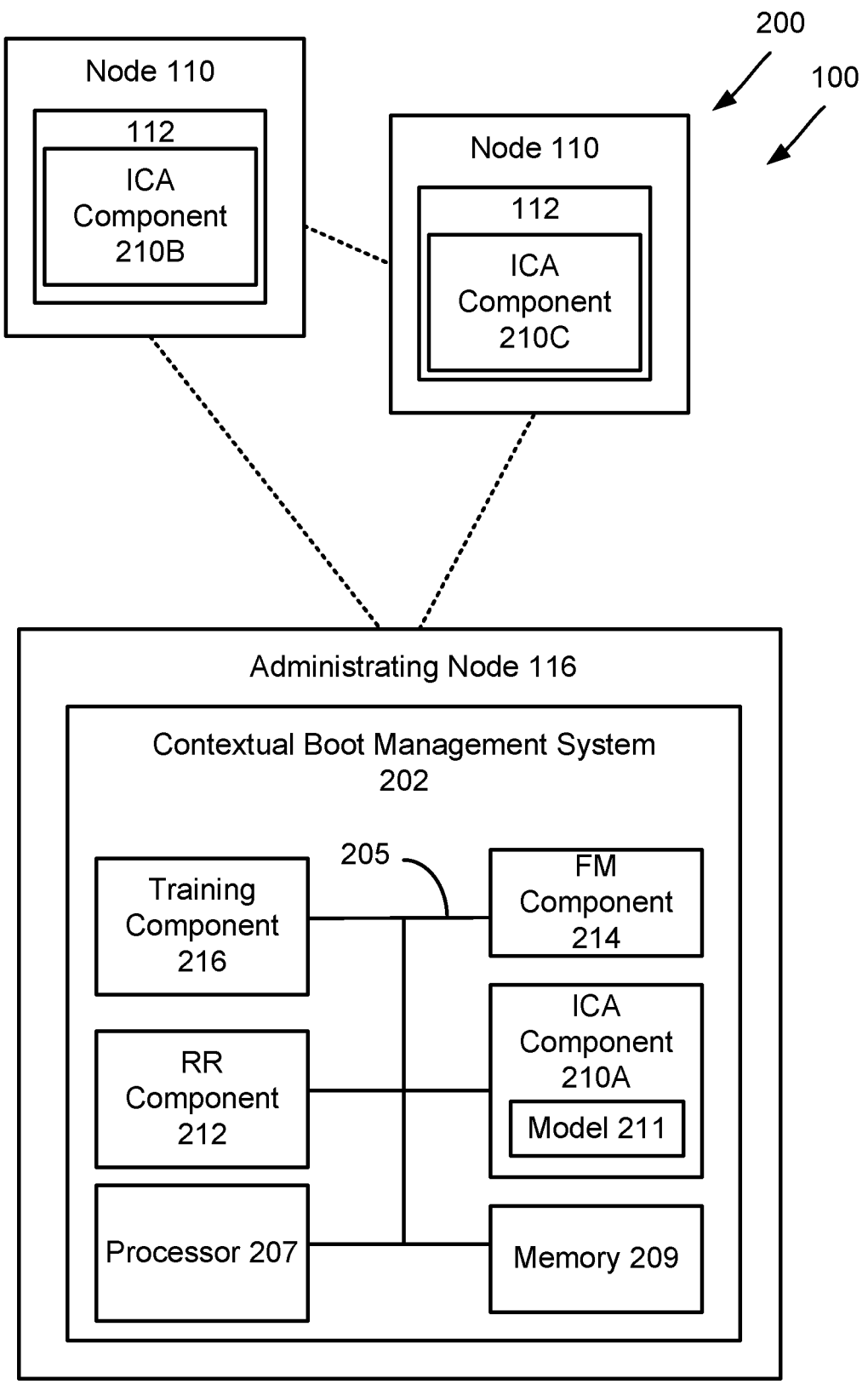
FIG. 2 illustrates another block diagram of the multi-node system of FIG. 1 with additional detail, in accordance with one or more embodiments and/or implementations described herein.

Turning next to FIG. 2, another schematic of the multi-node system 100 is depicted, illustrating additional details of one or more nodes 110 and of the administrating node 116. While referring here to one or more processes, operations, facilitations and/or uses of the non-limiting system architecture 200 of the multi-node system 100, description provided herein, both above and below, also can be relevant to one or more other non-limiting system architectures described herein.

Generally, the non-limiting system architecture 200 can facilitate a process to manage booting (e.g., rebooting, initializing, re-initializing and/or the like) of one or more hardware and/or software components. The one or more hardware and/or software components can be comprised by and/or external to the non-limiting system architecture 200. In one or more cases, the non-limiting system architecture 200 can manage booting of one or more modules 112 of the non-limiting system architecture 200, where the one or more modules 112 can comprise the one or more hardware and/or software components. In one or more cases, the non-limiting system architecture 200 can manage booting of one or more nodes 110 of the non-limiting system architecture 200, wherein the one or more nodes 110 can comprise the one or more hardware and/or software components, such as being comprised by one or more modules 112 of the one or more nodes 110.

FIG. 2 illustrates the non-limiting system architecture 200 comprising the administrating node 116, which can comprise at least a portion of a contextual boot management system 202. Generally, the contextual boot management system 202 can leverage contextual information acquired regarding an issue that has occurred and/or that is occurring at one or more of the one or more hardware and/or software components of the non-limiting system architecture 200 and/or external to the non-limiting system architecture 200. For purposes of illustration and description below, one or more hardware and/or software components having such one or more issues are illustrated and/or described as being comprised by the non-limiting system architecture 200.

The various components of the contextual boot management system 202 will now be described. Generally, the contextual boot management system 202 can comprise any suitable computing devices, hardware, software, operating systems, drivers, network interfaces and/or so forth. However, for purposes of brevity, only components generally relevant to contextual rebooting are illustrated in FIG. 2.

The administrating node 116 can comprise a portion of, a majority of and/or all of the contextual boot management (CBM) system 202. As illustrated, the administrating node 116 can comprise a processor 207, memory 209, bus 205, impacted component analyzer (ICA) component 210A, rapid reboot (RR) component 212, fallback mechanism (FM) component 214, and/or training component 216.

In one or more embodiments, such as illustrated, one or more nodes 110 can comprise an ICA component, such as the illustrated ICA components 210B and 210C. The ICA components 210B and/or 210C can be considered part of the CBM system 202. At the nodes 110, the ICA components 210B and 210C can be comprised by respective modules 112. In one or more embodiments, the ICA components 210B and 210C can be operated by and/or controlled by a respective per-node processor or other controller (not particularly shown)

Communication among the administrating node 116, nodes 110, the components thereof, and/or any other component of the CBM system can be by any suitable method. Communication can be facilitated by wired and/or wireless methods including, but not limited to, employing a cellular network, a wide area network (WAN) (e.g., the Internet), and/or a local area network (LAN). Suitable wired or wireless technologies for facilitating the communications can include, without being limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra-mobile broadband (UMB), high speed packet access (HSPA), Zigbee and other 802.XX wireless technologies and/or legacy telecommunication technologies, BLUETOOTH®, Session Initiation Protocol (SIP), ZIGBEE®, RF4CE protocol, WirelessHART protocol, 6LoWPAN (Ipv6 over Low power Wireless Area Networks), Z-Wave, an ANT, an ultra-wideband (UWB) standard protocol and/or other proprietary and/or non-proprietary communication protocols.

Discussion first turns to the processor 207, memory 209 and bus 205 of the contextual boot management system 202.

In one or more embodiments, contextual boot management system 202 can comprise a processor 207 (e.g., computer processing unit, microprocessor, classical processor and/or like processor). In one or more embodiments, a component associated with contextual boot management system 202, as described herein with or without reference to the one or more figures of the one or more embodiments, can comprise one or more computer and/or machine readable, writable and/or executable components and/or instructions that can be executed by processor 207 to facilitate performance of one or more processes defined by such component(s) and/or instruction(s). In one or more embodiments, the processor 207 can comprise one or more of the ICA component 210A, RR component 212, FM component 214, and/or training component 216.

In one or more embodiments, the contextual boot management system 202 can comprise a machine-readable memory 209 that can be operably connected to the processor 207. The memory 209 can store computer-executable instructions that, upon execution by the processor 207, can cause the processor 207 and/or one or more other components of the contextual boot management system 202 (e.g., ICA component 210A, RR component 212, FM component 214, and/or training component 216) to perform one or more actions. In one or more embodiments, the memory 209 can store computer-executable components (e.g., ICA component 210A, RR component 212, FM component 214, and/or training component 216).

Contextual boot management system 202 and/or a component thereof as described herein, can be communicatively, electrically, operatively, optically and/or otherwise coupled to one another via a bus 205 to perform functions of non-limiting system architecture 200, contextual boot management system 202 and/or one or more components thereof and/or coupled therewith. Bus 205 can comprise one or more of a memory bus, memory controller, peripheral bus, external bus, local bus and/or another type of bus that can employ one or more bus architectures. One or more of these examples of bus 205 can be employed to implement one or more embodiments described herein.

In one or more embodiments, contextual boot management system 202 can be coupled (e.g., communicatively, electrically, operatively, optically and/or like function) to one or more external systems (e.g., a system management application), sources and/or devices (e.g., classical communication devices and/or like devices), such as via a network. In one or more embodiments, one or more of the components of the non-limiting system architecture 200 can reside in the cloud, and/or can reside locally in a local computing environment (e.g., at a specified location(s)).

In addition to the processor 207 and/or memory 209 described above, contextual boot management system 202 can comprise one or more computer and/or machine readable, writable and/or executable components and/or instructions that, when executed by processor 207, can facilitate performance of one or more operations defined by such component(s) and/or instruction(s).

Turning now to components of the CBM 202 other than the processor 207, memory 209 and bus 205, the ICA component 210A generally can conduct a component-level analysis of components (e.g., hardware components and/or software components) of a node 110 of the multi-node system 100. The ICA component 210A can access, by any of the aforementioned suitable methods, operational activity of one or more components, such as monitoring one or more logs, databases, memories and/or other storage to gather information for analyzing one or more such components. The ICA component 210A can perform the monitoring as a precaution, on a proactive basis, at a selectively determined frequency, and/or in response to an issue that has occurred, is occurring and/or is determined to reoccur.

For example, an issue, also herein referred to as a negative activity even, can be software-related, hardware-related, or software-and-hardware-related. An issue can comprise and/or concern a hung node, high load, fabric lifecycle restart and/or the like. An issue can have already occurred, can be occurring, and/or can reoccur as determined by the system. In one or more cases, the system can determine, based on monitoring analysis, that an issue is likely to occur, such as relative to a selectively determined likelihood threshold. Such threshold, and/or one or more other thresholds, can be determined by the system, such as by the processor 207, and/or by an administrating entity.

Based on the gathered information (e.g., data, metadata and/or the like), the ICA component 210A can recognize a node issue, such as an operational node issue or a health-related node issue of a node 110 of the multi-node system 100. As used herein, a node issue can be an issue with a server, module, software component, hardware component and/or the like of a node 110. Further, the ICA component 210A can generally determine one or more impacts of the node issue, such as can be occurring and/or can occur at a future time, relative to the affected component and/or relative to one or more additional software and/or hardware components. Additionally, upon determination of the node issue, the ICA component 210A can generally output a status report for one or more nodes and/or generate and output a recommendation for addressing (e.g., mitigating) the node issue.

In one or more embodiments, the analysis and determination of the node issue and/or of one or more additional impacts can be based on information (such as pre-generated information) comprising one or more error codes, error causes, error impacts (e.g., of one or more other components), entity-inputted comments, log data and/or the like that can be stored for purpose of comparison by the ICA component 210A against data relative to the present node issue. Such information can be stored at the memory 209 and/or at any other suitable location internal and/or external to the multi-node system 100.

In one or more embodiments, such information can comprise historical data based on previously occurred node issues relative to the multi-node system 100 and/or relative to another system. The historical information can comprise error codes, error causes, error impacts (e.g., of one or more other components), event ID's, log data and/or the like that can be stored for purpose of comparison by the ICA component 210A against data relative to the present node issue. Such information can be stored at the memory 209 and/or at any other suitable location internal and/or external to the multi-node system 100.

In one or more embodiments, an impact analysis performed by the ICA component 210A can identify one or more components that can be affected by the node issue due to a possible reoccurrence and/or in the future. The ICA component 210A likewise can, as part of the impact analysis, determine one or more additional node issues that can result from the initial node issue.

In one or more embodiments, the ICA component 210A can comprise and/or employ a model 211 for performing the aforementioned data analysis and/or comparison. The model 211 can be comprised by the ICA component 210A as illustrated at FIG. 2, and/or can be located at any suitable location internal and/or external to the non-limiting system architecture 200.

The model 211 can be an artificial intelligence (AI) model, machine learning (ML) model and/or deep learning (DL) model. That is, the model 211 can be an intelligent model 211 that can learn from negative activity occurrences to build one or more databases for use in analyzing future negative activity occurrences, and/or can learn from negative activity occurrences to more accurately and/or efficiently analyze and/or mitigate future negative activity occurrences. The model 211 can generate comments, notes and/or logs of negative activity that can be viewed by an administrating entity and/or employed by the model 211.

In one or more embodiments, the ICA component 210A additionally and/or alternatively to the model 211 can employ one or more tools such as node OS, health applications, application programming interfaces, remote access controllers of the nodes or servers, coordination services, and/or the like to perform the determination and analysis.

In response to the analysis performed by the ICA component 210A, the ICA component further can generate the aforementioned reboot recommendation for provision to the RR component 214. The reboot recommendation can be output to the RR component 214 by any suitable method and/or interface.

In one or more embodiments, the reboot recommendation can comprise a recommendation from a group of reboot recommendations comprising full and partial reboot recommendations. A partial reboot can be recommended where one or more software components exhibits the determined node issue (e.g., is affected by, is impacted by and/or is a factor that caused the determined node issue). The partial reboot can be recommended by the ICA component 210A absent recommendation of a corresponding hardware component reboot. In this way, a full reboot of a node and/or module can be avoided, thus providing a more efficient and targeted reboot process for mitigating determined issues. Indeed, such reboot recommendation can be based on the intelligent analysis and impact analysis performed by the ICA component 210A, as compared to the mere single solution of a full reboot as employed by existing technologies regardless of the cause/impact of a node issue.

Alternatively, wherein the node issue is exhibited by a hardware component (e.g., is caused by, is affected by and/or impacts a hardware component), the ICA component 210A can recommend a full reboot rather than a partial reboot of a node, module and/or the like.

In response to the one or more recommendations, informations, communications and/or the like output by the ICA component 210A, the RR component 212 can generally set a reboot flag for the multi-node system 100. The RR component 212 likewise can maintain the reboot flag until a next boot cycle is initiated, where the flag will be identified.

In one or more embodiments, a reboot flag can be generated where a node and/or system BIOS can observe the reboot flag upon reboot (e.g., of an OS for example). A reboot flag can be stored at and/or set at the BIOS and/or NVRAM, for example. That is prior to a reboot being issued and/or initiated, and/or as part of a reboot, a BIOS can search for the presence of an RR flag set by the RR component 212. Based on an indication of the reboot flag, the BIOS can perform a selectively determined reboot (e.g., a partial reboot or a full reboot) of a node, module, system and/or the like.

The RR component 212 can employ an indicator of 0 or 1 to differentiate between specification of a partial reboot or a full reboot, and thus between a software reboot (e.g., partial reboot) and a hardware or hardware/software reboot (e.g., full reboot). In one or more embodiments, a partial reboot can correspond to an indicator 0, and a full reboot can correspond to an indicator 1. In one or more embodiments, the RR component can provide additional indication as to one or more particular components to be reboot as part of the specified partial or full reboot.

For example, where only partial reboot is indicated, such as by the indicator 0, one or more software components, layers, OS/applications layers and/or the like can be reboot absent reboot of one or more corresponding hardware components.

Further, once the specified reboot is performed based on the reboot flag and associated additional information (e.g., setting), the RR component 212 can receive and/or otherwise obtain an acknowledgement from the system, such as from the administrating node 116 and/or processor 207 of a successful or non-successful reboot. In response, the reboot flag can be removed, maintained and/or updated to a different indicator.

Turning now to the FM component 214, monitoring of the multi-node system 100 prior to, during and after a reboot can be performed. A monitoring engine of the FM component 214 can function along with the ICA component 210A to perform analysis and/or determination of any additional node issues.

Generally, in one or more cases, the FM component 214 can be responsible for providing the post-boot acknowledgement to the RR component 212. That is, the acknowledgement can be generated and output based on post-reboot monitoring conducted by the FM component 214. Where the reboot was successful, the FM component 214 can recommend removal of the reboot flag. Where the reboot was not successful, the FM component 214 can maintain the reboot flag and/or change the flag indicator to specify a full reboot.

In one or more embodiments, the FM component 214 can function in three different stages of analysis—before reboot, during reboot and after reboot.

Before reboot, where an additional error is discovered the FM component 214 can work in a self-healing mode to attempt to fix the error. The FM component 214 can have knowledge regarding a hardware and software state of a node prior to the reboot, such as from the ICA component 210. The FM component 214 and ICA component 210 can communicate with one another to analyze the node issue and/or any continually occurring issues and/or impacts of the initial node issue.

During reboot, the FM component 214 can compare the present state with a known good or successful state to ensure that there is no additional or new node issue occurring.

In one or more cases, where the RR component 212 receives another reboot recommendation from the FM component 214 and/or from the ICA component 210, the FM component 214 can recommend a full reboot flag be set to the RR component 212. This full reboot recommendation can be based on one or more selectively determined thresholds.

A selectively determined threshold can be set for a quantity of node issues and/or reoccurring issues occurring in a selectively determined time period. For example, a threshold can be transitioned where a node issue reoccurs within a time window after reboot and/or where three (same or different) issues occur within a second time window. Any such selectively determined threshold can be set by an administrating entity and/or by the CBM system 202, such as by the processor 207, for example, such as based on historical data.

In one or more cases, during any of the aforementioned three stages, the FM component 214 can recommend a change to a full reboot from a partial reboot. For example, prior to reboot, the FM component 214 can recommend a change in the reboot flag indicator. During reboot, the FM component 214 can recommend halting the partial reboot, if able, and instead conducting a full reboot. The one or more aforementioned thresholds can be employed both before and/or during a reboot. After the reboot, the FM component 214 can function as aforedescribed.

Figure 3:
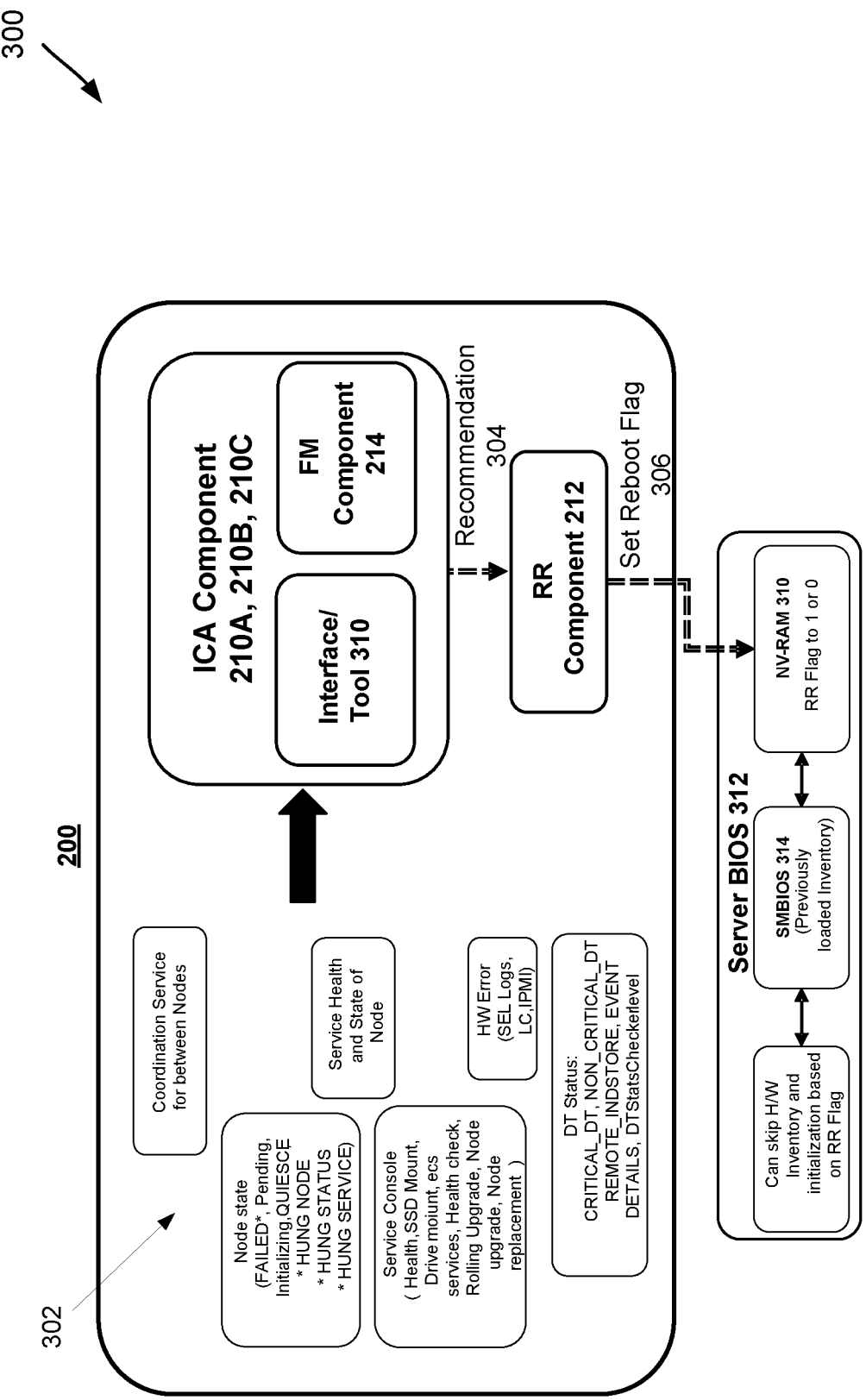
FIG. 3 illustrates a process flow diagram of use of the system of FIG. 2, in accordance with one or more embodiments and/or implementations described herein.

Turning now to FIG. 3, illustrated is a schematic of a high level process flow 300 of the non-limiting architecture 200 of FIG. 2, to provide an initial summary. As illustrated, one or more issues, such as node issues 302, can be recognized and/or determined by the ICA component. Employing the model 211 and/or one or more interfaces and/or tools 310, the node issue and data corresponding to the node issue 302 can be analyzed. As shown, the ICA component can communicate with and work in tandem with the FM component 214. In one or more embodiments, the FM component 214 can be comprised by the ICA component 210A. As a result of the performance of operations by the ICA component, the RR component 212 can receive and/or otherwise obtain a recommendation 304. As a result of analysis of the recommendation 304 by the RR component 212, the RR component 212 can set a reboot flag 306, such as at a BIOS and/or NVRAM location 310. The BIOS, such as a server BIOS 312 can employ a system management BIOS (SMBIOS) 314 of previously loaded inventory. Further, the server BIOS 312 can search for and/or otherwise observe the reboot flag 306 and thus can base a reboot performed at least partially by the server BIOS 312 on an indicator and/or other information of the reboot flag 306 (also herein referred to as an RR flag). For example, in a case where the reboot flag 306 indicates a 0 indicator or a software node issue, a hardware inventory analysis and/or reboot can be skipped.

Figure 4:
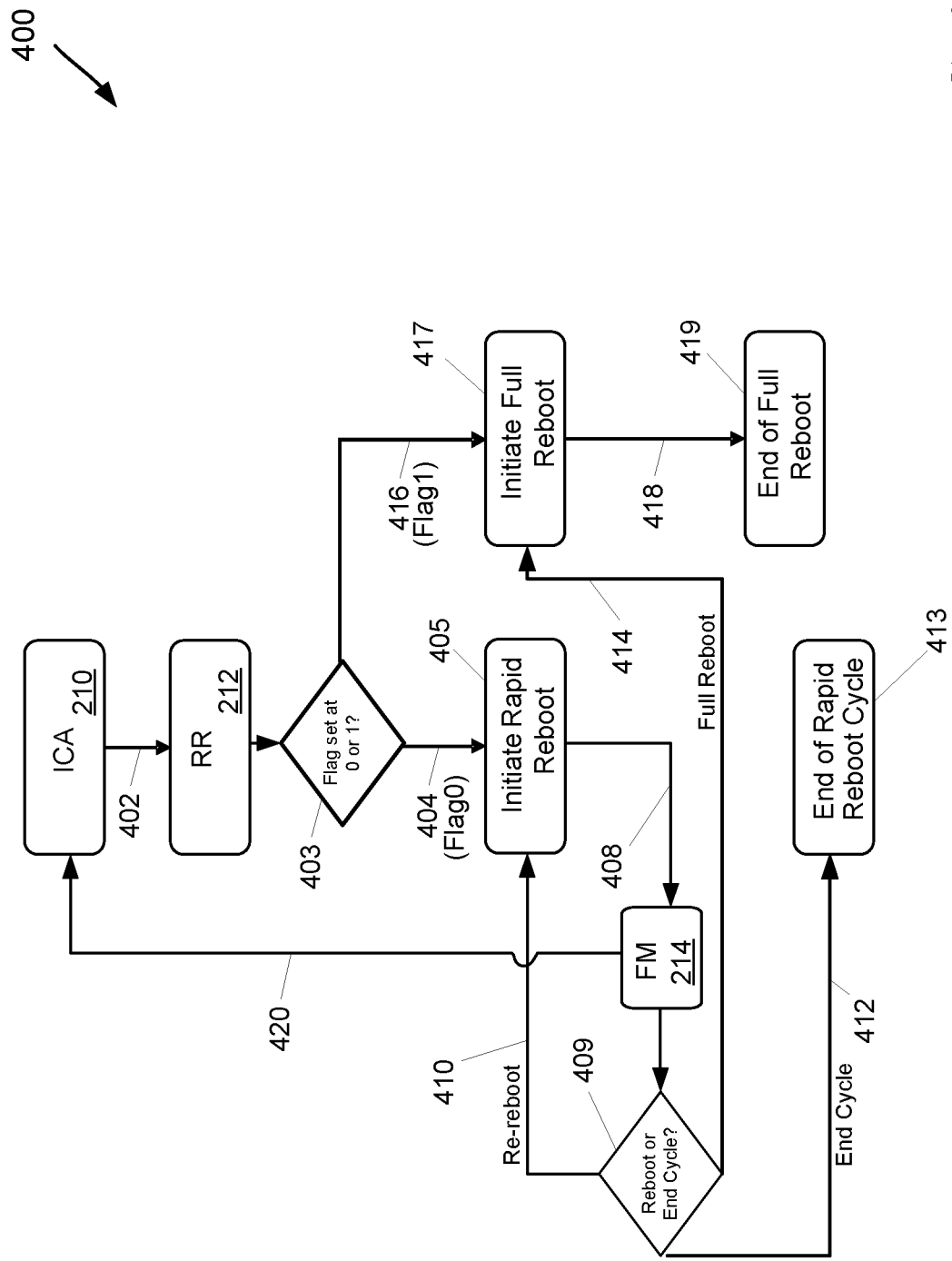
FIG. 4 illustrates another process flow diagram of use of the system of FIG. 2, in accordance with one or more embodiments and/or implementations described herein.

Turning next to FIG. 4, illustrated is a more detailed schematic of a process flow 400 of use of the CBM system 202 relative to a multi-node system, such as the multi-node system 100. At 210, the ICA component 210 can determine and/or observe a node issue and gather information related to the node issue. As shown via 420, the FM component 214 can provide information for use by the ICA component 210.

At 402, the ICA component 210 can provide a rapid reboot (RR) recommendation to the RR component 212, such as based on the analysis of the information gathered. At 403, a decision can be made by the RR component 212, such as based on the RR recommendation to issue a flag0 at 404 or a flag1 at 416.

In correspondence with a flag0 at 404, a rapid reboot (e.g., partial reboot) can be initiated by the respective system at 405. The FM component 214 can monitor the reboot process at 408. In response to the monitoring, the FM component 214 can generate a decision at 409 to re-reboot at 410, end the boot cycle at 412, and/or conduct a full reboot at 414. In correspondence with the decision 414, the rapid reboot can be disabled if still ongoing. The FM component 214 can communicate information from the monitoring at 420 to the ICA component 210.

In correspondence with a flag1 416, a full reboot can be initiated at 417, such as by the respective system. Where a successful full reboot is completed at 418, the full reboot cycle can be ended by the system at 419.

Turning back briefly again to FIG. 2, the CBM system 202 also can comprise a training component 216. The training component 216 can employ data written, generated and/or stored from an instance of a node issue to re-train the ICA component 210A, 210B and/or 210C and/or the model 211. The training component 216 can initiate training at any frequency, such as after each iteration of analysis of a node issue by an ICA component. Additionally, the training component 216 can be employed to initially train an ICA component, such as of a new node to a system, such as based on the aforementioned pre-generated and/or historical data.

Figure 5:
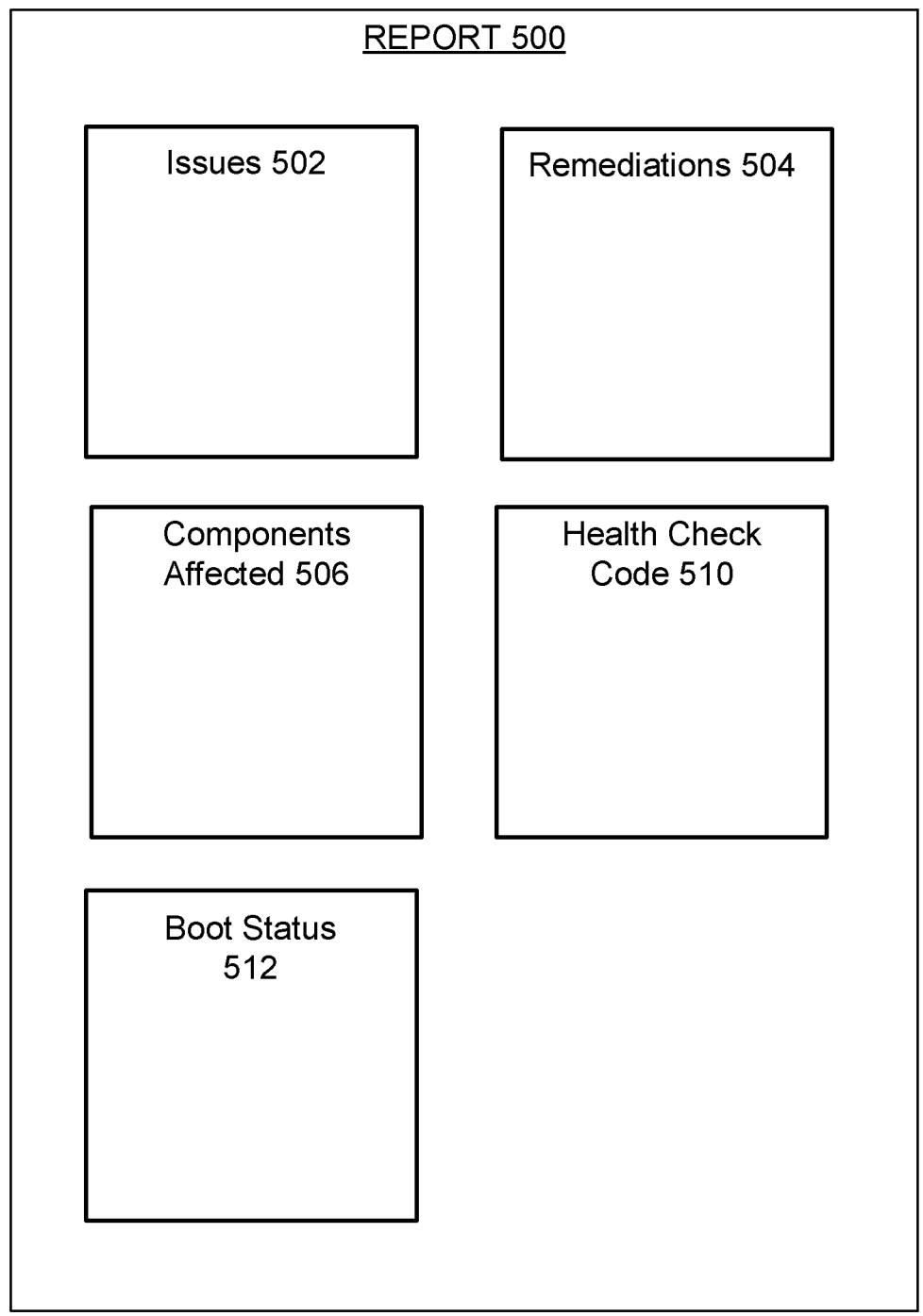
FIG. 5 illustrates a block diagram representing an exemplary report that can be provided by the system of FIG. 2, in accordance with one or more embodiments and/or implementations described herein.

Turning next to FIG. 5, and also still to FIG. 2, the CBM system 202 can generate a report 500 for use by an administrating entity and/or by the CBM system 202. In one or more embodiments, the report 500 can be generated by the FM component 214 and/or a respective ICA component. The report 500 can comprise a plurality of information including, but not limited to, determined issues 502, remediations 504 recommended and/or taken, component affected 506, code snippets from a health check 510, and/or a log/report of boot status 512 of an affected node.

Figure 6:
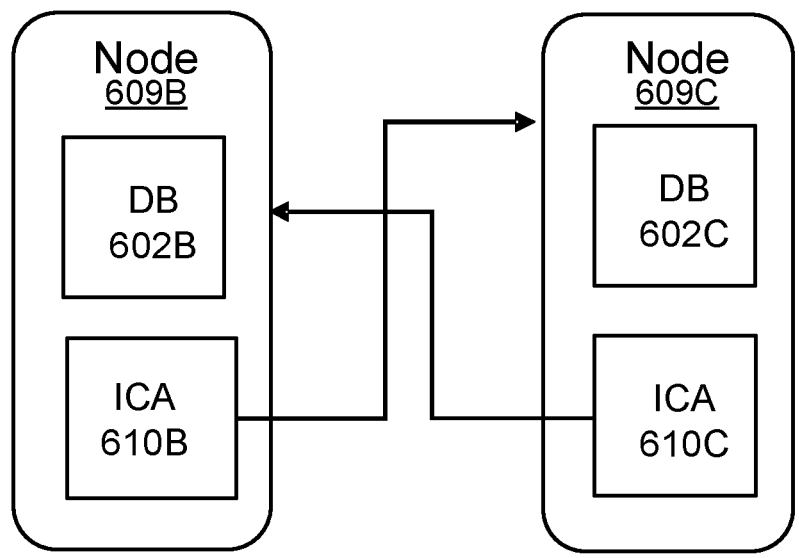
FIG. 6 illustrates a block diagram of another embodiment of a part of a multi-node system, in accordance with one or more embodiments and/or implementations described herein.

Referring now briefly to FIG. 6, illustrated is another embodiment of a portion of a multi-node system 600, similar to the multi-node system 100. Repetitive description of like elements and/or processes employed in respective embodiments is omitted for sake of brevity.

The partially-illustrated multi-node system 600 comprises at least a first node 609B and a second node 609C. As illustrated, each node 609B and 609C comprises a respective database (DB) 602 and a respective ICA component 610B, 610C. The databases (DBs) 602 can comprise any pre-loaded and/or historical information related to the respective node and/or related to another node, which information (e.g., data, metadata and/or the like) can be employed by the respective ICA component to analyze an issue at a neighboring node of the multi-node system 100. That is, in the illustrated embodiment, alternative to and/or in addition to analysis and determination performed by an ICA component of an administrating node, nodes of a multi-node system can monitor one another. That is the node 610B can analyze the node 610C in the case of a node issue at the node 610C, and vice versa. A node can employ the database 602 stored at the node, and/or can employ any other information accessible to the node. An ICA component of a node can employ a model at the administrating node 611 (e.g., the model 211), a model at another node, and/or a model stored at any other location accessible to the node. An ICA component of a node can employ any other analysis tool discussed above relative to the non-limiting system architecture 200.

In one or more embodiments, less than all nodes of a multi-node system can comprise respective ICA components. In one or more embodiments, a node-based ICA component can be at least partially controlled by a respective CBM system of an administrating node of a respective multi-node system.

Example Contextual Boot Management Operations

Figure 7:
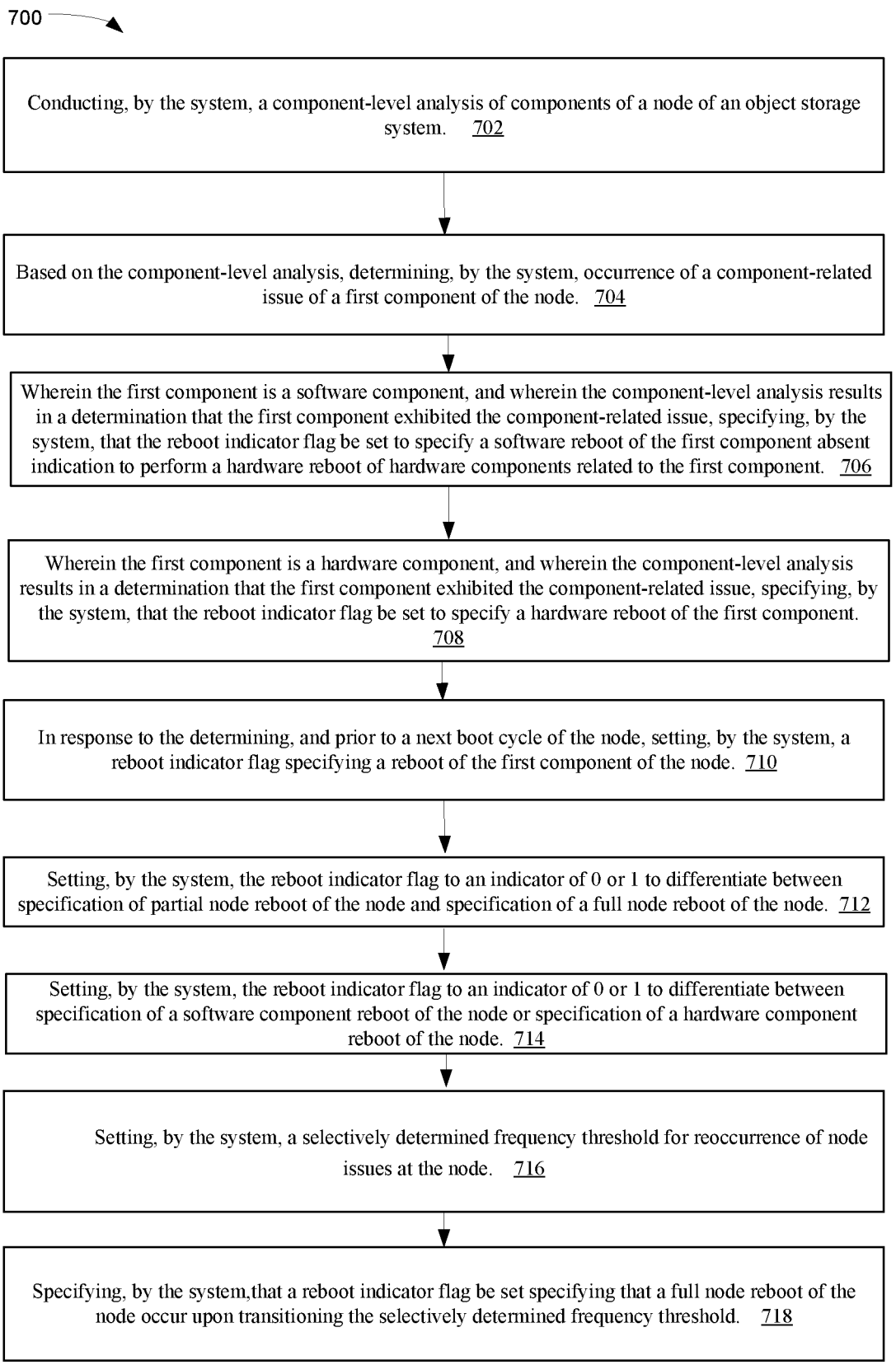
FIG. 7 illustrates a process flow diagram of a method of monitoring and managing booting of a multi-node system, in accordance with one or more embodiments and/or implementations described herein.

Turning next to FIG. 7, a process flow 700 comprising a set of operations is illustrated relative to FIG. 2, which set of operations can monitor and manage booting of the multi-node system of FIG. 2. One or more elements, objects and/or components referenced in the process flow 700 can be those of architecture 100 and/or diagram 200. Repetitive description of like elements and/or processes employed in respective embodiments is omitted for sake of brevity.

At operation 702, the process flow 700 can comprise conducting, by the system (e.g., ICA component 210), a component-level analysis of components of a node of an object storage system.

At operation 704, the process flow 700 can comprise, based on the component-level analysis, determining, by the system (e.g., ICA component 210), occurrence of a component-related issue of a first component of the node.

At operation 706, the process flow 700 can comprise, wherein the first component is a software component, and wherein the component-level analysis results in a determination that the first component exhibited the component-related issue, specifying, by the system (e.g., ICA component 210), that the reboot indicator flag be set to specify a software reboot of the first component absent indication to perform a hardware reboot of hardware components related to the first component.

At operation 708, the process flow 700 can comprise, wherein the first component is a hardware component, and wherein the component-level analysis results in a determination that the first component exhibited the component-related issue, specifying, by the system (e.g., ICA component 210), that the reboot indicator flag be set to specify a hardware reboot of the first component.

At operation 710, the process flow 700 can comprise, in response to the determining, and prior to a next boot cycle of the node, setting, by the system (e.g., RR component 212), a reboot indicator flag specifying a reboot of the first component of the node.

At operation 712, the process flow 700 can comprise setting, by the system (e.g., RR component 212), the reboot indicator flag to an indicator of 0 or 1 to differentiate between specification of partial node reboot of the node and specification of a full node reboot of the node.

At operation 714, the process flow 700 can comprise setting, by the system (e.g., RR component 212), the reboot indicator flag to an indicator of 0 or 1 to differentiate between specification of a software component reboot of the node or specification of a hardware component reboot of the node.

At operation 716, the process flow 700 can comprise setting, by the system (e.g., FM component 214), a selectively determined frequency threshold for reoccurrence of node issues at the node.

At operation 718, the process flow 700 can comprise specifying, by the system (e.g., FM component 214), that a reboot indicator flag be set specifying that a full node reboot of the node occur upon transitioning the selectively determined frequency threshold.

Figure 8:
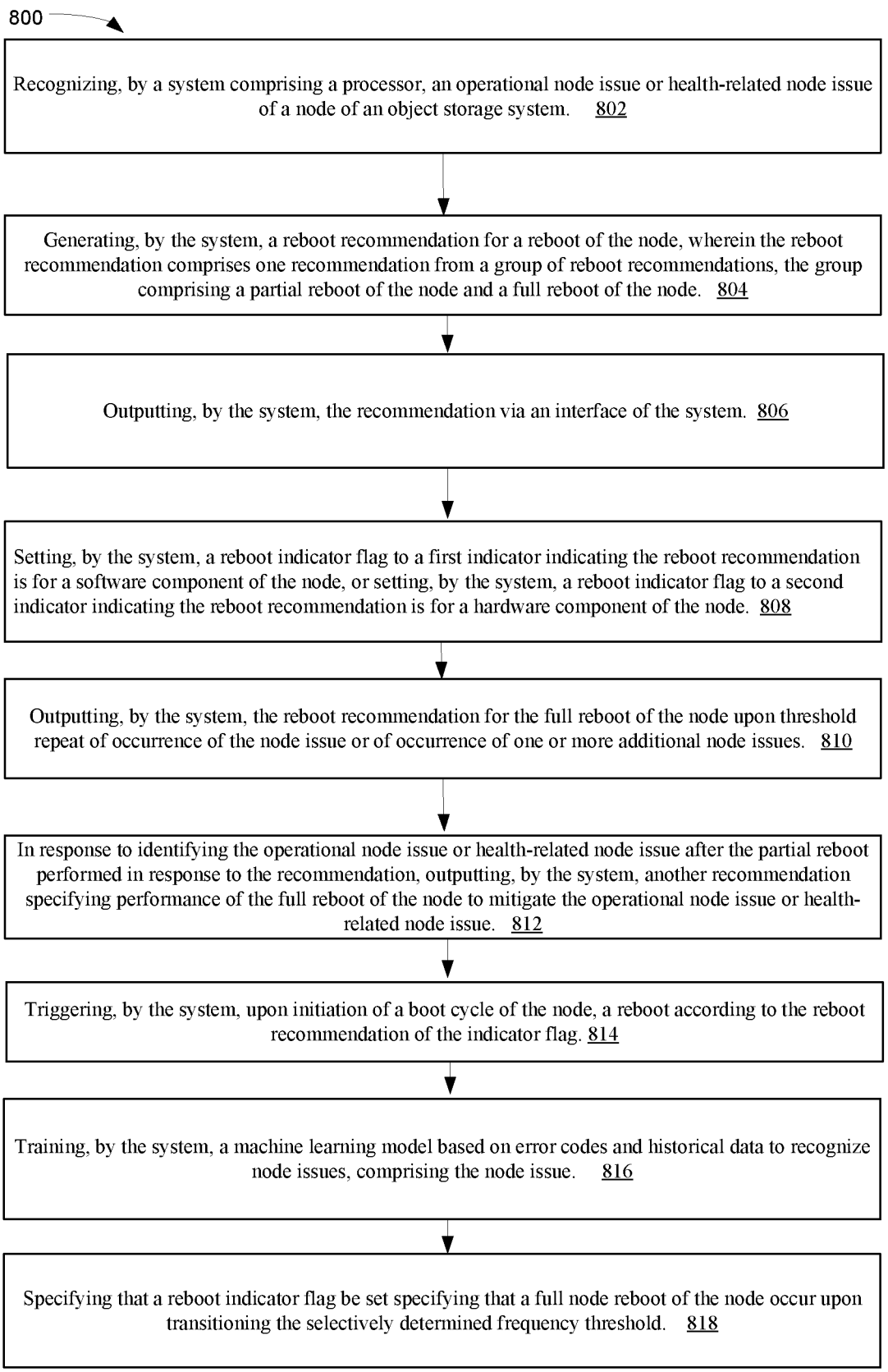
FIG. 8 illustrates a process flow diagram of a method of monitoring and managing booting of a multi-node system, in accordance with one or more embodiments and/or implementations described herein.

Turning now to FIG. 8, another process flow 800 comprising a set of operations is illustrated relative to FIG. 2, which set of operations, separately from those of the process flow 700, also can monitor and manage booting of the multi-node system of FIG. 2. One or more elements, objects and/or components referenced in the process flow 800 can be those of architecture 100 and/or diagram 200. Repetitive description of like elements and/or processes employed in respective embodiments is omitted for sake of brevity.

At operation 802, the process flow 800 can comprise recognizing, by a system comprising a processor, an operational node issue or health-related node issue of a node of an object storage system.

At operation 804, the process flow 800 can comprise generating, by the system, a reboot recommendation for a reboot of the node, wherein the reboot recommendation comprises one recommendation from a group of reboot recommendations, the group comprising a partial reboot of the node and a full reboot of the node.

At operation 806, the process flow 800 can comprise outputting, by the system, the recommendation via an interface of the system.

At operation 808, the process flow 800 can comprise setting, by the system, a reboot indicator flag to a first indicator indicating the reboot recommendation is for a software component of the node, or setting, by the system, a reboot indicator flag to a second indicator indicating the reboot recommendation is for a hardware component of the node.

At operation 810, the process flow 800 can comprise outputting, by the system, the reboot recommendation for the full reboot of the node upon threshold repeat of occurrence of the node issue or of occurrence of one or more additional node issues.

At operation 812, the process flow 800 can comprise in response to identifying the operational node issue or health-related node issue after the partial reboot performed in response to the recommendation, outputting, by the system, another recommendation specifying performance of the full reboot of the node to mitigate the operational node issue or health-related node issue.

At 814, the process flow 800 can comprise triggering, by the system, upon initiation of a boot cycle of the node, a reboot according to the reboot recommendation of the indicator flag.

At 816, the process flow 800 can comprise training, by the system, a machine learning model based on error codes and historical data to recognize node issues, comprising the node issue.

For simplicity of explanation, the computer-implemented methodologies and/or processes provided herein are depicted and/or described as a series of acts. The subject innovation is not limited by the acts illustrated and/or by the order of acts, for example acts can occur in one or more orders and/or concurrently, and with other acts not presented and described herein. The operations of process flows 300, 400, 700 and/or 800 comprise example operations, and there can be one or more embodiments that implement more or fewer operations than are depicted.

Furthermore, not all illustrated acts can be utilized to implement the computer-implemented methodologies in accordance with the described subject matter. In addition, the computer-implemented methodologies could alternatively be represented as a series of interrelated states via a state diagram or events. Additionally, the computer-implemented methodologies described hereinafter and throughout this specification are capable of being stored on an article of manufacture to facilitate transporting and transferring the computer-implemented methodologies to computers. The term article of manufacture, as used herein, is intended to encompass a computer program accessible from any machine-readable device or storage media.

In summary, technology described herein is generally directed towards an efficient process to selectively boot (e.g., initialize, re-boot, re-initialize and/or the like) one or more nodes of a server node system based on contextual information that can be automatically acquired. In an embodiment, a system can comprise a processor, and a memory that stores executable instructions that, when executed by the processor, can facilitate performance of operations. The operations can comprise monitoring operational activity of a node of a software-defined object storage system. The operations can comprise, in response to occurrence of a negative activity event determined based on a result of the monitoring, determining whether a node reboot of the node is to be implemented. The operations can comprise, based on the operational activity analyzed, setting a reboot flag indicating that the node reboot is to comprise a reboot of less than all components of the node.

As a result, a method can be provided to intelligently analyze a node issue and to selectively reboot one or more components of the affected node, absent, in one or more cases, a full system reboot of all hardware and/or software components. For example, by analyzing a node issue that has and/or is occurring at a node, and further by assessing one or more impacts of the issue, contextual booting (e.g., selective booting based on acquired contextual information) can be enabled. The selective booting can allow for software booting of a node, separate from full hardware and software booting. In one or more embodiments, the selective booting can allow for one or more particular software components and/or hardware components to be booted, absent booting of other software and/or hardware components, such as where an issue has occurred relating to only one or more of the aforementioned various processes. This can in turn reduce boot time, reduce processing power consumed, reduce monitoring by an administrator device and/or increase customer satisfaction with a respective server node system.

Indeed, one or more embodiments described herein can proactively address one or more module-related and/or node-related issues via frequency-based monitoring, and by setting one or more flags for being encountered during a boot. Accordingly, when a next node boot occurs, contextual information gathered regarding the module-related and/or node-related issue(s) can be employed to selectively boot one or more portions of a node. Likewise, one or more operations described herein can be employed at a module-level, within a node, for booting of one or more modules.

The systems and/or devices have been (and/or will be further) described herein with respect to interaction between one or more components. Such systems and/or components can include those components or sub-components specified therein, one or more of the specified components and/or sub-components, and/or additional components. Sub-components can be implemented as components communicatively coupled to other components rather than included within parent components. One or more components and/or sub-components can be combined into a single component providing aggregate functionality. The components can interact with one or more other components not specifically described herein for the sake of brevity, but known by those of skill in the art.

One or more embodiments described herein are inherently and/or inextricably tied to computer technology and cannot be implemented outside of a computing environment. For example, one or more processes performed by one or more embodiments described herein can more efficiently, and even more intelligently, provide program and/or program instruction execution as compared to existing systems and/or techniques. Systems, computer-implemented methods and/or computer program products facilitating performance of these processes are of great utility in the field of data storage and/or multi-server system management and cannot be equally practicably implemented in a sensible way outside of a computing environment.

One or more embodiments described herein can employ hardware and/or software to solve problems that are highly technical, that are not abstract, and that cannot be performed as a set of mental acts by a human. For example, a human, or even thousands of humans, cannot efficiently, accurately and/or effectively manage a computer-based reboot process. And, neither can the human mind nor a human with pen and paper electronically a computer-based reboot process as conducted by one or more embodiments described herein.

In one or more embodiments, one or more of the processes described herein can be performed by one or more specialized computers (e.g., a specialized processing unit, a specialized classical computer, and/or another type of specialized computer) to execute defined tasks related to the one or more technologies describe above. One or more embodiments described herein and/or components thereof can be employed to solve new problems that arise through advancements in technologies mentioned above, employment of cloud computing systems, computer architecture and/or another technology.

One or more embodiments described herein can be fully operational towards performing one or more other functions (e.g., fully powered on, fully executed and/or another function) while also performing the one or more operations described herein.

Example Operating Environment

Figure 9:
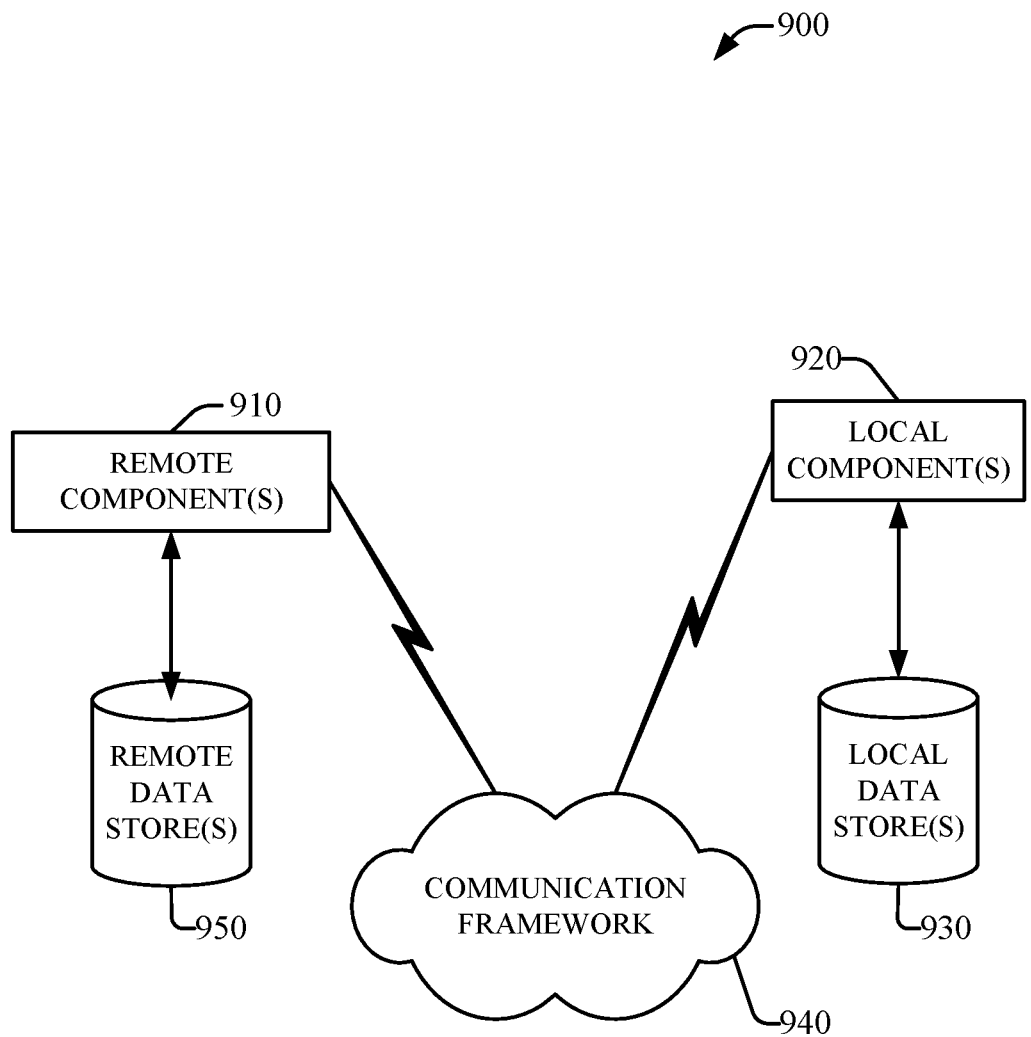
FIG. 9 illustrates a block diagram of an example operating environment into which embodiments of the subject matter described herein can be incorporated.

FIG. 9 is a schematic block diagram of an operating environment 900 with which the described subject matter can interact. The operating environment 900 comprises one or more remote component(s) 910. The remote component(s) 910 can be hardware and/or software (e.g., threads, processes, computing devices). In some embodiments, remote component(s) 910 can be a distributed computer system, connected to a local automatic scaling component and/or programs that use the resources of a distributed computer system, via communication framework 940. Communication framework 940 can comprise wired network devices, wireless network devices, mobile devices, wearable devices, radio access network devices, gateway devices, femtocell devices, servers, etc.

The operating environment 900 also comprises one or more local component(s) 920. The local component(s) 920 can be hardware and/or software (e.g., threads, processes, computing devices). In some embodiments, local component(s) 920 can comprise an automatic scaling component and/or programs that communicate/use the remote resources 910 and 920, etc., connected to a remotely located distributed computing system via communication framework 940.

One possible communication between a remote component(s) 910 and a local component(s) 920 can be in the form of a data packet adapted to be transmitted between two or more computer processes. Another possible communication between a remote component(s) 910 and a local component(s) 920 can be in the form of circuit-switched data adapted to be transmitted between two or more computer processes in radio time slots. The operating environment 900 comprises a communication framework 940 that can be employed to facilitate communications between the remote component(s) 910 and the local component(s) 920, and can comprise an air interface, e.g., interface of a UMTS network, via a long-term evolution (LTE) network, etc. Remote component(s) 910 can be operably connected to one or more remote data store(s) 950, such as a hard drive, solid state drive, SIM card, device memory, etc., that can be employed to store information on the remote component(s) 910 side of communication framework 940. Similarly, local component(s) 920 can be operably connected to one or more local data store(s) 930, that can be employed to store information on the local component(s) 920 side of communication framework 940.

Example Computing Environment

Figure 10:
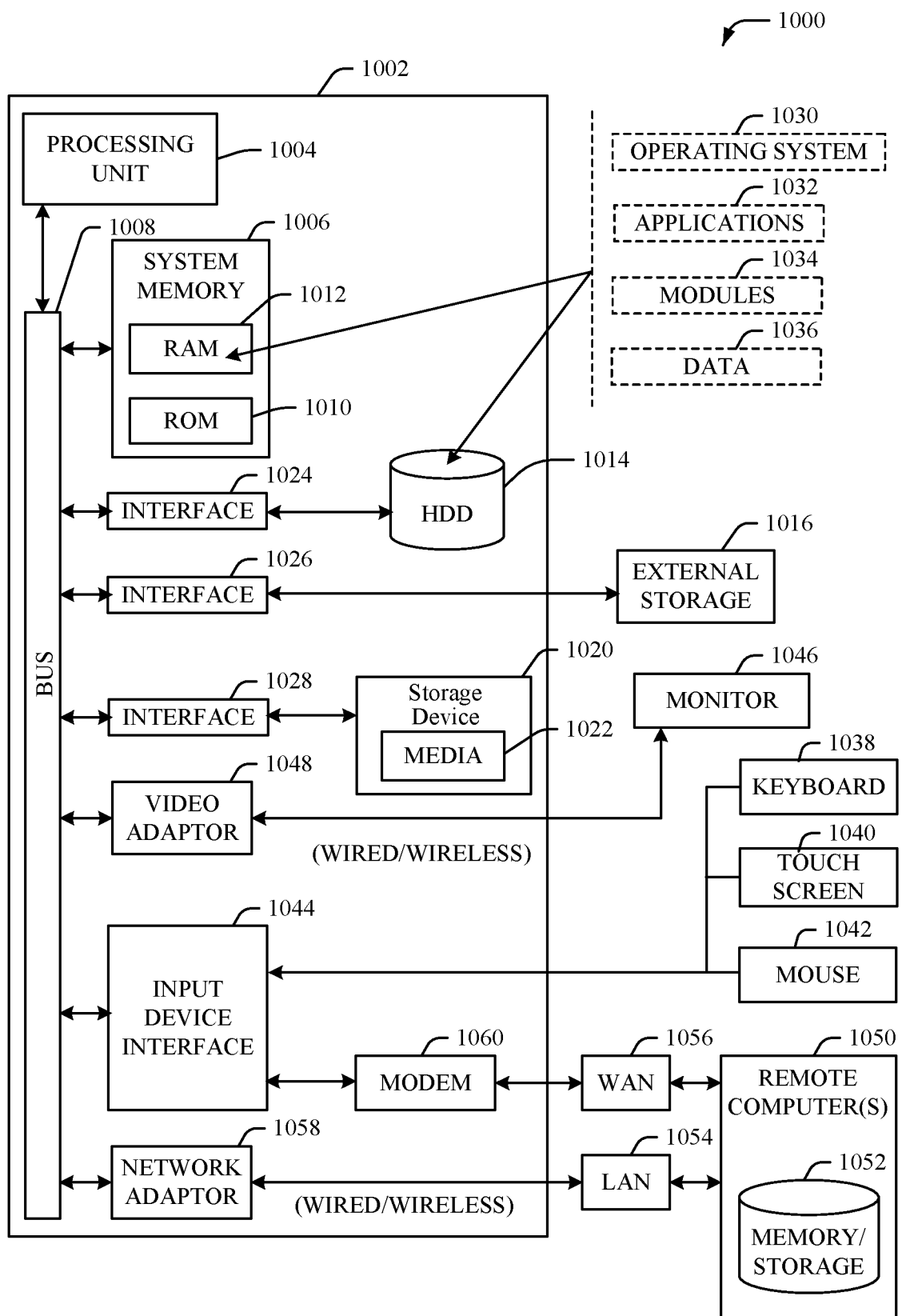
FIG. 10 illustrates an example schematic block diagram of a computing environment with which the subject matter described herein can interact and/or be implemented at least in part, in accordance with one or more embodiments and/or implementations described herein.

In order to provide additional context for various embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

Referring still to FIG. 10, the example computing environment 1000 which can implement one or more embodiments described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multiprocessor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a nonvolatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), and can include one or more external storage devices 1016 (e.g., a magnetic floppy disk drive (FDD) 1016, a memory stick or flash drive reader, a memory card reader, etc.). While the internal HDD 1014 is illustrated as located within the computer 1002, the internal HDD 1014 can also be configured for external use in a suitable chassis (not shown). Additionally, while not shown in computing environment 1000, a solid state drive (SSD) could be used in addition to, or in place of, an HDD 1014.

Other internal or external storage can include at least one other storage device 1020 with storage media 1022 (e.g., a solid state storage device, a nonvolatile memory device, and/or an optical disk drive that can read or write from removable media such as a CD-ROM disc, a DVD, a BD, etc.). The external storage 1016 can be facilitated by a network virtual machine. The HDD 1014, external storage device(s) 1016 and storage device (e.g., drive) 1020 can be connected to the system bus 1008 by an HDD interface 1024, an external storage interface 1026 and a drive interface 1028, respectively.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. The network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

CONCLUSION

The above description of illustrated embodiments of the one or more embodiments described herein, comprising what is described in the Abstract, is not intended to be exhaustive or to limit the described embodiments to the precise forms described. While one or more specific embodiments and examples are described herein for illustrative purposes, various modifications are possible that are considered within the scope of such embodiments and examples, as those skilled in the relevant art can recognize.

In this regard, while the described subject matter has been described in connection with various embodiments and corresponding figures, where applicable, other similar embodiments can be used or modifications and additions can be made to the described embodiments for performing the same, similar, alternative, or substitute function of the described subject matter without deviating therefrom. Therefore, the described subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures to optimize space usage or enhance performance of user equipment. A processor can also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

While the embodiments are susceptible to various modifications and alternative constructions, certain illustrated implementations thereof are shown in the drawings and have been described above in detail. However, there is no intention to limit the various embodiments to the one or more specific forms described, but on the contrary, the intention is to cover all modifications, alternative constructions, and equivalents falling within the spirit and scope.

In addition to the various implementations described herein, other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the various embodiments are not to be limited to any single implementation, but rather are to be construed in breadth, spirit and scope in accordance with the appended claims.

What is claimed is:

1. A system, comprising:
   a processor; and
   a memory that stores executable instructions that, when executed by the processor, facilitate performance of operations, comprising:
   monitoring operational activity of a node of a software-defined object storage system;
   in response to occurrence of a first negative activity event determined based on a result of the monitoring, determining whether a node reboot of the node is to be implemented;
   based on the operational activity analyzed, setting a reboot flag indicating that the node reboot is to comprise a reboot of less than all components of the node;
   setting a selectively determined threshold for occurrence of at least the first negative activity event or a second negative activity event other than the first negative activity event; and
   in response to satisfaction of the selectively determined threshold by the second negative activity event, setting another reboot flag, other than the reboot flag and corresponding to a full reboot of all components of the node.

2. The system of claim 1, wherein the operations further comprise:
   upon initiating a boot cycle of the node, determining whether the reboot flag or the other reboot flag is posted, and, in response to the reboot flag or the other reboot flag being determined to be posted, conducting the boot cycle according to the reboot flag or the other reboot flag.

3. The system of claim 1, wherein the operations further comprise:
   in response to the setting of the reboot flag or the other reboot flag, monitoring activity of the node before, during, and after the reboot according to the reboot flag or the other reboot flag.

4. The system of claim 1, wherein the operations further comprise:
   setting the other reboot flag after setting of the reboot flag.

5. The system of claim 1, wherein the operations further comprise:
   in response to a determination of the second negative activity event during or after a reboot of the node according to the reboot flag, pausing the reboot and initiating a full reboot of all components of the node according to the other reboot flag.

6. The system of claim 1, wherein the operations further comprise:
   identifying the occurrence of the first negative activity event or the second negative activity event as the occurrence of a service-based node issue or as the occurrence of a health-based node issue.

7. The system of claim 1, wherein the operations further comprise:
   identifying the occurrence of the first negative activity event or the second negative activity event based on a comparison of operational activity data representative of the operational activity of the node to historical operational activity data representative of historical operational activity of the node or of another node of the software-defined object storage system.

8. The system of claim 1, wherein the selectively determined threshold comprises a limit to a frequency of the one or more second negative activity event.

9. The system of claim 1, wherein the operations further comprise:
   setting the selectively determined threshold after setting of the reboot flag.

10. A non-transitory machine-readable medium, comprising executable instructions that, when executed by a processor facilitate performance of operations, comprising:
    conducting a component-level analysis of components of a node of an object storage system;
    based on the component-level analysis, determining occurrence of a component-related issue of a first component of the node;

in response to the determining, and prior to a next boot cycle of the node, setting a reboot indicator flag specifying a reboot of the first component of the node;

setting a selectively determined frequency threshold for recurrence of the component-related issue of the first component of the node; and setting a second reboot indicator flag specifying that a full node reboot of the node occur upon transitioning the selectively determined frequency threshold.

11. The non-transitory machine-readable medium of claim 10, wherein the operations further comprise:

wherein the first component is a software component, and wherein the component-level analysis results in a determination that the first component exhibited the component-related issue, setting the reboot indicator flag to specify a software reboot of the first component absent indication to perform a hardware reboot of hardware components related to the first component.

12. The non-transitory machine-readable medium of claim 10, wherein the operations further comprise:

wherein the first component is a hardware component, and wherein the component-level analysis results in a determination that the first component exhibited the component-related issue, setting the reboot indicator flag to specify a hardware reboot of the first component.

13. The non-transitory machine-readable medium of claim 10, wherein the operations further comprise:

setting the reboot indicator flag to an indicator of 0 or 1 to differentiate between specification of partial node reboot of the node and specification of the full node reboot of the node.

14. The non-transitory machine-readable medium of claim 10, wherein the operations further comprise:

setting the reboot indicator flag to an indicator of 0 or 1 to differentiate between specification of a software component reboot of the node or specification of a hardware component reboot of the node.

15. A method, comprising:

recognizing, by a system comprising a processor, an operational node issue or health-related node issue of a node of an object storage system;

generating, by the system, a reboot recommendation for a reboot of the node, wherein the reboot recommendation is one of a group of reboot recommendations for at least a partial reboot of the node and a full reboot of the node;

outputting, by the system, the reboot recommendation via an interface of the system; and setting a selectively determined threshold for one or more occurrences of the operational node issue or one or more occurrences of the health-related node issue of the node, wherein the reboot recommendation comprises a first recommendation for a partial reboot of the node upon a next boot cycle or a second recommendation for a full reboot in response to satisfaction of the selectively determined threshold.

16. The method of claim 15, further comprising:

setting, by the system, a reboot indicator flag to a first indicator indicating the reboot recommendation is for a software component of the node, or setting, by the system, the reboot indicator flag to a second indicator indicating the reboot recommendation is for a hardware component of the node.

17. The method of claim 16, further comprising:

triggering, by the system, upon initiation of a boot cycle of the node, a reboot according to the reboot recommendation of the reboot indicator flag.

18. The method of claim 15, further comprising:

training, by the system, a machine learning model based on error codes and historical data to recognize node issues comprising the operational node issue or health-related node issue of the node.

19. The method of claim 15, wherein the outputting comprises:

outputting, by the system, the reboot recommendation comprising the second recommendation for the full reboot upon satisfying the selectively determined threshold.

20. The method of claim 16, further comprising:

setting, by the system, the selectively determined threshold after setting the reboot indicator flag.

* * * * *